Sept. 25, 1956  P. A. WALLACE  2,764,728
FREQUENCY REGULATOR DEVICE
Filed Sept. 10, 1952
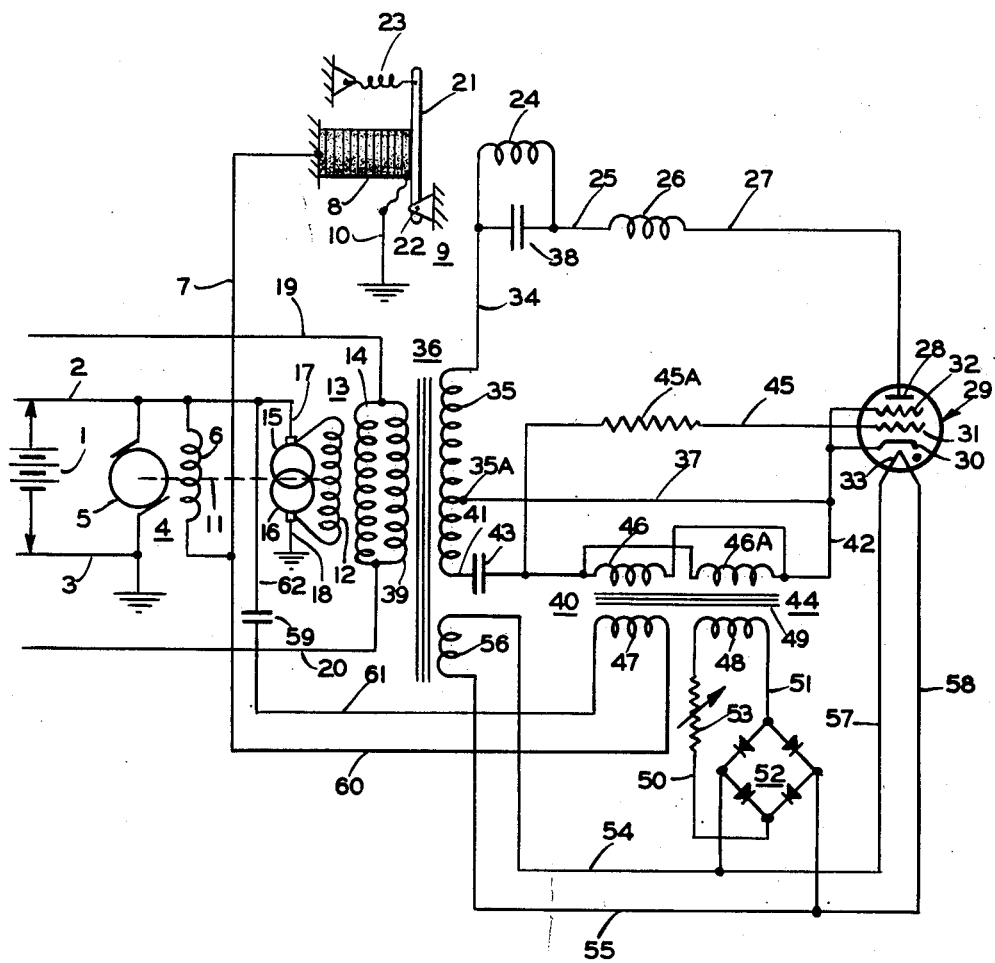
INVENTOR.
PHILEMON A. WALLACE
BY
*James M. Nichols*
ATTORNEY United States Patent Office 2,764,728
Patented Sept. 25, 1956

2,764,728

FREQUENCY REGULATOR DEVICE

Philemon A. Wallace, Bloomfield, N. J., assignor to Bendix Aviation Corporation, Teterboro, N. J., a corporation of Delaware Application September 10, 1952, Serial No. 308,879

4 Claims. (Cl. 322—19)

The present invention relates to dynamoelectric machines and more particularly to regulating systems for dynamoelectric machines.

In certain applications of dynamoelectric machines, for example, in an inverter, it is desirable to provide some means for frequency control. In applications where it is necessary to hold the frequency within narrow limits considerable difficulty has been encountered with hunting. If the regulating system has the sensitivity necessary to maintain the frequency within the predetermined limits it over-controls, and an oscillatory condition occurs causing the machine to hunt around the desired speed of operation. The sensitivity of the system could be reduced to a point where hunting ceases, however, this would result in so great a loss of control that the system would no longer be useful for close frequency control.

In the present invention hunting is prevented by separating the dynamic change produced by transients from the steady state condition and to feed back the dynamic change, out of phase, to the input of the control circuit.

It is an object of the invention to provide a novel regulating system for dynamoelectric machines.

Another object of the invention is to provide a novel and improved frequency regulating system.

Another object of the invention is to provide novel anti-hunting means for an inverter.

Another object of the invention is to provide novel feed back means for a regulating system.

The above and other objects and features of the invention will appear more fully hereinafter from a consideration of the following description taken in connection with the accompanying drawing wherein one embodiment of the invention is illustrated by way of example.

In the drawing:

The single figure is a diagrammatical showing of a system embodying the invention.

Referring to the drawing, there is provided a source of direct current which, for the purpose of illustration, is shown as a battery 1, which is connected by conductors 2 and 3 to a motor indicated generally by the numeral 4. The motor 4 is illustrated as having an armature 5 and a shunt field winding 6.

One end of the winding 6 is connected to the conductor 2 while the other end is connected by a conductor 7 to one end of a variable resistance element 8, illustrated as a carbon pile, of a frequency regulator indicated generally by the numeral 9. The other end of the element 8 is connected by conductor 10 to ground.

The motor 4 drives, through a shaft diagrammatically represented by the dashed line 11, an exciting winding 12 of an alternating current generator indicated generally by the numeral 13. The generator 13 in addition to the exciting winding 12 includes an output or stator winding 14.

The exciting winding 12 is connected to the slip rings 15 and 16. The ring 15 is connected by a conductor 17 to the conductor 2 while the ring 16 is connected by conductor 18 to ground. It is understood that voltage regulating means may be incorporated in the circuit of the exciting winding 12 as is well known in the art, however, it has been omitted for the sake of simplicity. The output winding 14 is connected to output lines 19 and 20.

The frequency regulator 9 is shown diagrammatically as including an armature 21 pivoted at 22 and biased under tension of a spring 23 in a direction tending to decrease the resistance of the carbon pile 8. An electromagnetic winding 24 biases the armature 21 in a direction opposing the spring 23 tending to increase the resistance of the carbon pile 8.

One end of the winding 24 is connected by conductor 25, choke 26 and conductor 27 to anode 28 of an electron discharge device 29. The electron discharge device 29 may be a gas filled thyratron such as Type 2D21 and in addition to the anode 28 has a cathode 30, control grid 31, screen grid 32 and heater 33. The other end of the winding 24 is connected by conductor 34 to one end of a secondary winding 35 of transformer 36. The cathode 30 of the device 29 is connected by a conductor 37 to a tap 35A on the secondary winding 35. The screen grid 32 is tied to the cathode 30. A capacitor 38 may be connected across the winding 24.

The secondary winding 35 of the transformer 36 is energized by a primary winding 39 connected across the output conductors 19 and 20. A resonant circuit 40 is connected across a portion of the winding 35 by conductors 41 and 42. The circuit 40 comprises a capacitance 43 connected in series with an inductance 44. The control grid 31 is connected by conductor 45, and limiting resistor 45A across the inductance 44.

The inductance 44 is of the saturable type having alternating current windings 46 and 46A, direct current windings 47 and 48 and a core 49, which may be of the EI type. The windings 46 and 46A are connected in parallel and may be wound on the outer legs of the core 49. The winding 48 is connected by conductors 50 and 51 across the output of rectifier 52. A variable resistor 53 may be inserted in the conductor 50 to adjust the bias of the winding 48. The input of the rectifier 52 is connected by conductors 54 and 55 across secondary winding 56 of the transformer 36. Also connected across the winding 56 by conductors 57 and 58 is the heater 33 of the device 29.

The winding 47 serves as a degenerative feedback winding and is connected in series with a capacitor 59 across the field winding 6 by conductors 60, 61 and 62. The windings 47 and 48 may be wound on the center leg of the EI type core.

In operation, the resonant circuit 44 is tuned, by means of the resistor 53, to resonance at a frequency slightly different from the desired control frequency. This places the operation point on the slope of the resonance curve and thereby provides large change in control current for a small change in the regulated frequency. The voltage across the inductance 44 is fed through the current limiting resistor 45A to the control grid 31 of the device 29. A phase difference exists between the control grid voltage and the plate voltage of the device 29. Inasmuch as this phase difference changes with changes in frequency, due to the resonant circuit, it can be seen that the plate current varies with frequency. Since the control winding 24 of the frequency regulator is energized from the output of the device 29 the resistance of the carbon pile is changed accordingly.

The winding 47 is adapted to furnish a degenerative bias to the saturable inductance 44. The capacitor 59 blocks out the direct current steady state condition of the field winding, however, any dynamic change, such as hunting, causes a uni-directional current to flow through the winding 47. Thus, the inductance of the windings 46 and 46A is varied by impulses fed back from the field winding 6 through the winding 47 which is polarized so that the effect of the impulses feedback is degenerative. This results in stabilization of the complete frequency control system. By the use of a parallel connection for the windings 46 and 46A, harmonics do not appear, due to transformer action in the bias windings 47 and 48.

While the feedback has been illustrated as taken from across the field winding, it is understood that it may be taken from other places in the system.

Thus, the aforenoted frequency control system eliminates hunting and holds frequency variations within a very narrow range over a wide range of input voltage and load variations.

Although only one embodiment of the invention has been illustrated and described, various changes in the form and relative arrangement of the parts, which will now appear to those skilled in the art, may be made without departing from the scope of the invention.

What is claimed is:

1. A frequency regulating system for a motor generator set having a field winding for controlling the speed thereof, comprising a variable resistance element for controlling the energization of said field winding, a control winding for said resistance element, a circuit adapted to energize said control winding in accordance with the output frequency of said set, said circuit including impedance elements proportioned to resonate at a frequency slightly different from a predetermined operating frequency, and means connected to said impedance elements in a direction to opposite transient changes in said circuit.

2. Apparatus for use in regulating the output frequency of an alternating current generator driven by an electric motor having a field winding for controlling the speed thereof, comprising a variable resistance element connected in the field winding circuit, an electromagnetic winding for controlling said resistance element, a circuit including an electron discharge device for connecting said electromagnetic winding to the output of said generator, a control grid for said electron discharge device, means including a saturable inductance for producing a control voltage for said grid in accordance with said output frequency, and means responsive to transient changes across said field winding to oppose transient changes in said control voltage.

3. Apparatus for use in regulating the output frequency of an alternating current generator driven by a direct current motor having a field winding for controlling the speed thereof, comprising a variable resistance element for controlling the energization of said field winding, a control winding for said resistance element, a circuit including a gaseous discharge device for connecting said control winding to the output of said generator, said discharge device having a control electrode, a frequency responsive circuit energized from the output of said generator for supplying a control voltage to said grid, and means for varying the frequency response of said frequency responsive circuit in accordance with transit changes in said system.

4. Apparatus for use in regulating the output frequency of an alternating current generator driven by an electric motor having a field winding comprising a variable resistance element connected in series with said field winding to vary the energization thereof, a control winding for said resistance element, a circuit including a gaseous discharge device having an anode, a cathode and a control electrode for connecting said control winding for energization from the output of said generator, a series resonant circuit including a capacitor connected in series with a saturable inductance and energized from the output of said generator, said saturable inductance having a pair of alternating current windings connected in parallel, a biasing winding and a feedback winding, means for energizing said biasing winding to resonate said circuit at a frequency slightly different from a predetermined operating frequency, means including a capacitor for connecting said feedback winding across said field winding, and means for connecting said control electrode to said resonant circuit to control the conductivity of said discharge device.

References Cited in the file of this patent

UNITED STATES PATENTS

| Number | Name | Date |
|---|---|---|
| 2,499,272 | Haas | Feb. 28, 1950 |
| 2,521,639 | Lauricella et al. | Sept. 5, 1950 |
| 2,526,133 | Haas | Oct. 17, 1950 |
| 2,531,727 | Emerson | Nov. 28, 1950 |
| 2,607,028 | Gartner | Aug. 12, 1952 |
| 2,685,670 | Horrell | Aug. 3, 1954 |

FOREIGN PATENTS

| Number | Country | Date |
|---|---|---|
| 404,917 | Great Britain | Apr. 18, 1932 |